(12) United States Patent
Chen et al.

(10) Patent No.: US 11,113,816 B2
(45) Date of Patent: Sep. 7, 2021

(54) IMAGE SEGMENTATION APPARATUS, METHOD AND RELEVANT COMPUTING DEVICE

(71) Applicant: BOE TECHNOLOGY GROUP CO., LTD., Beijing (CN)

(72) Inventors: Guannan Chen, Beijing (CN); Lijie Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/651,946

(22) PCT Filed: Sep. 19, 2019

(86) PCT No.: PCT/CN2019/106559
§ 371 (c)(1),
(2) Date: Mar. 27, 2020

(87) PCT Pub. No.: WO2020/063426
PCT Pub. Date: Apr. 2, 2020

(65) Prior Publication Data
US 2020/0334819 A1 Oct. 22, 2020

(30) Foreign Application Priority Data
Sep. 30, 2018 (CN) .......................... 201811156790.7

(51) Int. Cl.
*G06K 9/46* (2006.01)
*G06T 7/10* (2017.01)
*G06N 3/02* (2006.01)

(52) U.S. Cl.
CPC .................. *G06T 7/10* (2017.01); *G06K 9/46* (2013.01); *G06N 3/02* (2013.01); *G06T 2207/20084* (2013.01)

(58) Field of Classification Search
CPC .. G06K 9/00; G06K 9/62; G06K 9/46; G06K 9/20; G06K 9/34; G06K 9/72; G06K 9/32;
(Continued)

(56) References Cited

U.S. PATENT DOCUMENTS

2012/0263342 A1* 10/2012 Haas ........................ G06K 9/00
382/100
2015/0235447 A1* 8/2015 Abovitz ............. G02B 27/0101
345/633
(Continued)

FOREIGN PATENT DOCUMENTS

| CN | 105869174 A | 8/2016 |
|----|----|----|
| CN | 107784654 A | 3/2018 |

(Continued)

OTHER PUBLICATIONS

International Search Report received for PCT Patent Application No. PCT/CN2019/106559, dated Dec. 19, 2019, 5 pages (2 pages of English Translation and 3 pages of Original Document).
(Continued)

*Primary Examiner* — Quan M Hua
(74) *Attorney, Agent, or Firm* — Womble Bond Dickinson (US) LLP (57) ABSTRACT

The present disclosure provides an image segmentation apparatus, method and relevant computing device. The image segmentation apparatus comprises: a feature extractor configured to extract N image semantic features having different scales from an input image, where N is an integer not less than 3; and a feature processor comprising cascaded dense-refine networks and being configured to perform feature processing on the N image semantic features to obtain a binarized mask image for the input image. A dense-refine network is configured to generate a low-frequency semantic feature from semantic features input
(Continued)

thereto by performing densely-connected convolution processing on the semantic features respectively to obtain respective image global features, performing feature fusion on the image global features to obtain a fused image global feature, and performing pooling processing on the fused image global feature to generate and output the low-frequency semantic feature. The semantic features are selected from a group consisting of the N image sematic features and low-frequency semantic features generated by dense-refine networks. The feature processor is configured to obtain the binarized mask image based on low-frequency semantic features generated by the dense-refine networks.

20 Claims, 6 Drawing Sheets (58) Field of Classification Search
CPC .. G06K 9/36; G06K 9/66; G06K 9/78; G06K 9/18; G06K 9/52; G06K 9/68; G06N 3/04; G06N 3/08; G06N 5/02; G06N 20/00; G06N 99/00; G06N 5/04; G06N 20/20; G06N 7/00; G06N 3/02; G06T 7/11; G06T 7/194; G06T 7/00; G06T 17/05; G06T 7/10; G06T 7/13; G06T 15/20; G06T 15/40; G06T 3/00; G06T 7/155; G06T 7/514; G06T 7/70; G06T 7/73; G06T 9/00; G06T 11/60; G06T 13/20; G06T 13/40; G06T 15/04; G06T 17/20; G06T 19/20; G06T 3/40; G06T 5/00; G06T 5/20; G06T 7/12; G06T 7/246; G06T 7/50; G06T 7/90; G06T 11/20; G06T 13/80; G06T 15/00; G06T 19/00; G06T 7/143; G06T 7/174; G06T 7/215; G06T 7/40
See application file for complete search history.

(56) References Cited

U.S. PATENT DOCUMENTS

| 2017/0124409 | A1 | 5/2017 | Choi et al. | |
| 2018/0089505 | A1* | 3/2018 | El-Khamy | G06T 7/73 |
| 2018/0276454 | A1* | 9/2018 | Han et al. | G06K 9/00281 |
| 2019/0228529 | A1 | 7/2019 | Sun et al. | |

FOREIGN PATENT DOCUMENTS

| CN | 107871119 A | 4/2018 |
| CN | 108062754 A | 5/2018 |
| CN | 109389078 A | 2/2019 |

OTHER PUBLICATIONS

Jiayuan et al., "Image haze removal based on sky region detection and dark channel prior", Journal of Image and Graphics, vol. 20, No. 4, Apr. 2015, pp. 0514-0519 {15 pages (9 pages of English Translation and 6 pages of Original Document)}.

La Place et al., "Segmenting Sky Pixels in Images", Computer Vision and Pattern Recognition, Jan. 8, 2018, 11 pages.

Shen et al., "Sky Region Detection in a Single Image for Autonomous Ground Robot Navigation", International Journal of Advanced Robotic Systems, vol. 10, No. 362, Jan. 2013, pp. 1-13.

First Office Action of Chinese Patent Application No. 201811156790.7 dated Jun. 28, 2021 (12 pages of English translation and 13 pages of Original document).

Guosheng Lin, et al., "RefineNet: Multi-Path Refinement Networks for High-Resolution Semantic Segmentation," dated Nov. 25, 2016 (11 pages).

Gao Huang, et al., "Densely Connected Convolutional Netwiorks," dated Jan. 28, 2018 (9 pages).

Hang Li, et al., "Skin Lesion Segmentation via Dense Connected Deconvolutional Network," 2018 24th International Conference on Pattern Recognition (ICPR), Beijing, China, Aug. 20-24, 2018, pp. 671-675 (5 pages).

* cited by examiner

IMAGE SEGMENTATION APPARATUS, METHOD AND RELEVANT COMPUTING DEVICE

CROSS REFERENCE TO RELATED APPLICATIONS

The present application is a 35 U.S.C. 371 national stage application of PCT International Application No. PCT/CN2019/106559, filed on Sep. 19, 2019, which claims the benefit of Chinese Patent Application No. 201811156790.7, filed on Sep. 30, 2018, the entire disclosures of which are incorporated herein by reference.

FIELD

The present disclosure relates to the technical field of digital image processing, and specifically to an image segmentation apparatus, method and relevant computing device.

BACKGROUND

Object recognition is a technique applied very widely in digital image processing. It requires recognizing and segmenting a designated object from complicated image contents according to features of it. The technique plays a very important role in many fields such as military affairs, transportation, commerce and medical care. As deep learning emerges, an object recognition algorithm also breaks through the bottleneck of related algorithms and has developed rapidly.

Recognition and segmentation of a special scene is a specific application of object recognition. It aims to accurately recognize a special scene area and distinguish it from other objects. For example, segmentation of a sky scene area is applied to some extent in aspects such as unmanned aerial vehicle vision, weather monitoring and entertainment APP. Segmentation of sky scene areas is now mainly based on techniques such as gradient statistics. In the case that sky features are insufficient distinct (e.g., in dense fog and dark night), there will be a large probability of occurrence of mis-segmentation. Similarly, as for a special scene area, a complex network structure is generally employed for recognition and segmentation to achieve an ideal segmentation effect, which seriously affects the operation efficiency of the Object recognition.

SUMMARY

According to a first aspect of embodiments of the present disclosure, there is provided an image segmentation apparatus. The image segmentation apparatus comprises: a feature extractor and a feature processor. The feature extractor is configured to extract N image semantic features having different scales from an input image, where N is an integer not less than 3. The feature processor comprises a plurality of cascaded dense-refine networks and is configured to perform feature processing on the N image semantic features to obtain a binarized mask image for the input image. Each dense-refine network is configured to generate a low-frequency semantic feature from a plurality of semantic features input thereto in the following manner: perform densely-connected convolution processing on the plurality of semantic features respectively to obtain corresponding multiple image global features, and perform feature fusion on the multiple image global features to obtain a fused image global feature, and perform pooling processing on the fused image global feature to generate and output the low-frequency semantic feature. The plurality of semantic features are selected from a group consisting of the N image sematic features and the low-frequency semantic features generated by the dense-refine networks. The feature processor is configured to obtain the binarized mask image based on a low-frequency semantic feature generated by the dense-refine networks.

According to embodiments of the present disclosure, each dense-refine network comprises L dense convolution units, a fusion unit, and a chain pooling unit. The L dense convolution units are configured to perform densely-connected convolution processing on L semantic features respectively which have different scales and are input to the dense-refine network to obtain corresponding L image global features, where 1<L<N. The fusion unit is configured to perform feature fusion on the L image global features to obtain a fused image global feature having a specific scale, wherein the specific scale is a maximum scale among the scales of the L semantic features. The chain pooling unit is configured to perform chain pooling processing on the fused image global feature to generate a low-frequency semantic feature having the specific scale. The feature processor is configured to obtain the binarized mask image based on the low-frequency semantic feature generated by a last dense-refine network in the cascade.

According to embodiments of the present disclosure, the feature processor comprises N−1 dense-refine networks cascaded according to a predetermined cascade relationship, and is configured to perform feature processing on the N image semantic features sequentially in an ascending order of scales. Given L=2, the predetermined cascade relationship is: two sematic features having adjacent scales and input into a first dense-refine network comprise an image semantic feature having a first scale and an image semantic feature having a second scale, and two sematic features having adjacent scales and input into an $n^{th}$ dense-refine network comprise a low-frequency semantic feature having an $n^{th}$ scale and an image semantic feature having an $n+1^{th}$ scale, and the low-frequency semantic feature having the $n^{th}$ scale is output by an $n-1^{th}$ dense-refine network, where $2 \leq n \leq N-1$.

According to embodiments of the present disclosure, each dense-refine network comprises two dense convolution units. The two dense convolution units are configured to perform densely-connected convolution processing on two sematic features having adjacent scales, respectively, to obtain two image global features having adjacent scales. The fusion unit is configured to perform feature fusion on the two image global features having adjacent scales to obtain the fused image global feature. The scale of the fused image global feature is the same as the larger scale of the two adjacent scales. The chain pooling unit is configured to perform pooling processing on the fused image global feature to generate the low-frequency semantic feature having the larger scale.

According to embodiments of the present disclosure, the dense convolution units comprise M levels of convolution sub-networks, M being an integer not less than two. The dense convolution units are configured to: perform convolution operation on the image semantic features through a first-level convolution sub-network to output a respective convolution result; and perform convolution operation on an input to an $m^{th}$-level convolution sub-network through the $m^{th}$-level convolution sub-network to output a respective convolution result, wherein the input is generated by concatenating the image semantic features with the convolution results output by the first to m−1$^{th}$ levels of convolution sub-networks, wherein 2≤m≤M. An output of an M$^{th}$-level convolution sub-network is taken as the image global feature obtained by the dense convolution unit.

According to embodiments of the present disclosure, the chain pooling unit is a chain dense pooling unit. The chain dense pooling unit comprises cascaded W pooling networks and a convolutional sub-network, where W is an integer not less than 2. The chain dense pooling unit is configured to: perform pooling operation on the fused image global feature through a first pooling network to output a respective pooling result; perform pooling operation on an input to a w$^{th}$ pooling network through the w$^{th}$ pooling network to output a respective pooling result, where the input is the pooling result output by a w−1$^{th}$ pooling network, and 1<w<W; chain-concatenate the fused image global feature with the pooling results output by the W pooling networks to generate a concatenated pooling output; and perform the convolution operation on the concatenated pooling output through the convolution sub-network to generate a respective low-frequency semantic feature.

According to embodiments of the present disclosure, the fusion unit comprises: convolution sub-units configured to perform convolution operations on the L image global features from the dense convolution units, respectively; an upsampling subunit configured to upsample image global features which are among the convoluted L image global features and have scales smaller than the specific scale; and a superimposition subunit configured to superimpose the upsampled image global features with the image global feature having the specific scale to generate the fused image global feature having the specific scale.

According to embodiments of the present disclosure, the feature extractor is configured to extract the image semantic features from the input image by using a convolutional neural network VGG-19.

According to a second aspect of embodiments of the present disclosure, there is provided an image segmentation method. The image segmentation method comprises: extracting N image semantic features having different scales from an input image, where N is an integer not less than 3; and performing feature processing on the N image semantic features through a plurality of cascaded dense-refine networks. The feature processing comprises operations performed by each dense-refine network, which include performing densely-connected convolution processing on a plurality of semantic features input thereto, respectively, to obtain multiple image global features, the plurality of semantic features being selected from a group consisting of the N image sematic features and low-frequency semantic features generated by the dense-refine networks; performing feature fusion on the multiple image global features to obtain a fused image global feature; and performing pooling processing on the fused image global feature, to generate and output the low-frequency semantic features. The image segmentation method further comprises: obtaining a binarized mask image of the input image based on a low-frequency semantic features generated by a define-refine network.

According to embodiments of the present disclosure, L semantic features having different scales are input to each dense-refine network. The feature processing comprises operations performed by each dense-refine network, which include performing densely-connected convolution processing on the L semantic features respectively to obtain L image global features, where 1<L<N; performing feature fusion on the L image global features to obtain a fused image global feature having a specific scale, wherein the specific scale is a maximum scale among the scales of the L semantic features; and performing chain pooling processing on the fused image global feature to generate a low-frequency semantic feature having the specific scale. The binarized mask image is obtained based on a low-frequency semantic feature generated by the last dense-refine network in the cascade.

According to embodiments of the present disclosure, the cascaded dense-refine networks comprise N−1 dense-refine networks cascaded according to a predetermined cascade relationship, and the feature processing is performed on the N image semantic features sequentially in an ascending order of scales. Given L=2, the predetermined cascade relationship is: two sematic features having adjacent scales and input into a first dense-refine network comprise an image semantic feature having a first scale and an image semantic feature having a second scale, and two sematic features having adjacent scales and input into an n$^{th}$ dense-refine network comprise a low-frequency semantic feature having an n$^{th}$ scale and an image semantic feature having an n+1$^{th}$ scale, and the low-frequency semantic feature having the n$^{th}$ scale is output by an n−1$^{th}$ dense-refine network, where 2≤n≤N−1.

According to embodiments of the present disclosure, the densely-connected convolution processing comprises operations performed by M levels of convolution sub-networks, which includes: performing convolution operation on the image semantic features through a first-level convolution sub-network to output a respective convolution result; and performing convolution operation on an input to an m$^{th}$-level convolution sub-network through the m$^{th}$-level convolution sub-network to output a respective convolution result, wherein the input is generated by concatenating the image semantic features with the convolution results output by the first to m−1$^{th}$ levels of convolution sub-networks, wherein 2≤m≤M. An output of an M$^{th}$-level convolution sub-network is taken as a corresponding obtained image global feature.

According to embodiments of the present disclosure, the chain pooling processing comprises performing the following operations performed by using cascaded W pooling networks and a convolution sub-network: performing pooling operation on the fused image global feature through a first pooling network to output a respective pooling result; performing pooling operation on input to a w$^{th}$ pooling network through the w$^{th}$ pooling network to output a respective pooling result, where the input is the pooling result output by a w−1$^{th}$ pooling network, and 1<w<W and W is an integer not less than 2; concatenating the fused image global feature with the pooling results output by the W levels of pooling networks to generate a concatenated pooling output; and performing the convolution operation on the concatenated pooling output to generate the low-frequency semantic feature.

According to a third aspect of embodiments of the present disclosure, there is provided a computing device. The computing device comprises a processor and a memory. The memory is used to store executable instructions. The executable instructions, when executed by the processor, cause the processor to perform the abovementioned image segmentation method.

According to a fourth aspect of embodiments of the present disclosure, there is provided a computer storage medium on which computer-executable instructions are stored. The computer-executable instructions, when executed by a processor, cause the processor to perform the abovementioned image segmentation method.

BRIEF DESCRIPTION OF THE DRAWINGS

The above and other features and advantages of the present disclosure will be made more apparent after specific embodiments are described in detail with reference to figures.

DETAILED DESCRIPTION

The embodiments of the present disclosure will be described in detail below, and examples of the embodiments are illustrated in the figures, wherein the same or like reference numerals are used to refer to the same or like elements or elements having the same or like functions throughout the description. The embodiments described below with reference to the figures are exemplary and are intended to illustrate the present disclosure only, and cannot be construed as limiting the present disclosure.

Those skilled in the art may appreciate that singular forms "a", "an", "said" and "the" may also include plural forms unless otherwise stated particularly. It should be further appreciated that the word "comprise" used in the description of the present disclosure refers to existence of the features, integers, steps, operations, elements and/or assemblies, but does not exclude existence or addition of one or more other features, integers, steps, operations, elements, assemblies and/or groups thereof. It should be understood that when we say an element is "connected" or "coupled" to another element, the element may be connected or coupled to the other element directly, or via an intermediate element. In addition, the "connected" or "coupled" used herein may include either a wireless connection or a wireless coupling. The word "and/or" used herein includes all or any unit and all combinations of one or more associated listed items.

Technical solutions of the present disclosure and how the technical solutions of the present disclosure solve the above technical problems will be described below in detail by describing specific embodiments with reference to figures. The following several specific embodiments may be combined with one another, and identical or similar concepts or processes might not be detailed any more in some embodiments.

Currently, the deep learning technique has made breakthrough progress in the field of human data perception. It may be used to for example describe image content, recognize objects in a complex environment in images and perform speech recognition in a noisy environment. In relevant technologies, a deep convolution network has already been utilized to implement image segmentation, e.g., segmenting a predetermined scene area (e.g., sky) in the images. Being trained with big data, a deep neural network may segment a sky area under different weather conditions (e.g., dense fog and dark night) and complicated image features. However, networks employed in the relevant technologies are structurally complicated, and a sky segmentation effect under dense fog and dark night is not ideal.

Embodiments of the present disclosure propose an image segmentation approach based on deep learning. It effectively improves the overall operation speed and achieves an ideal segmentation effect by employing a dense-refine network structure to perform feature processing for features at different scales.

Figure 1:
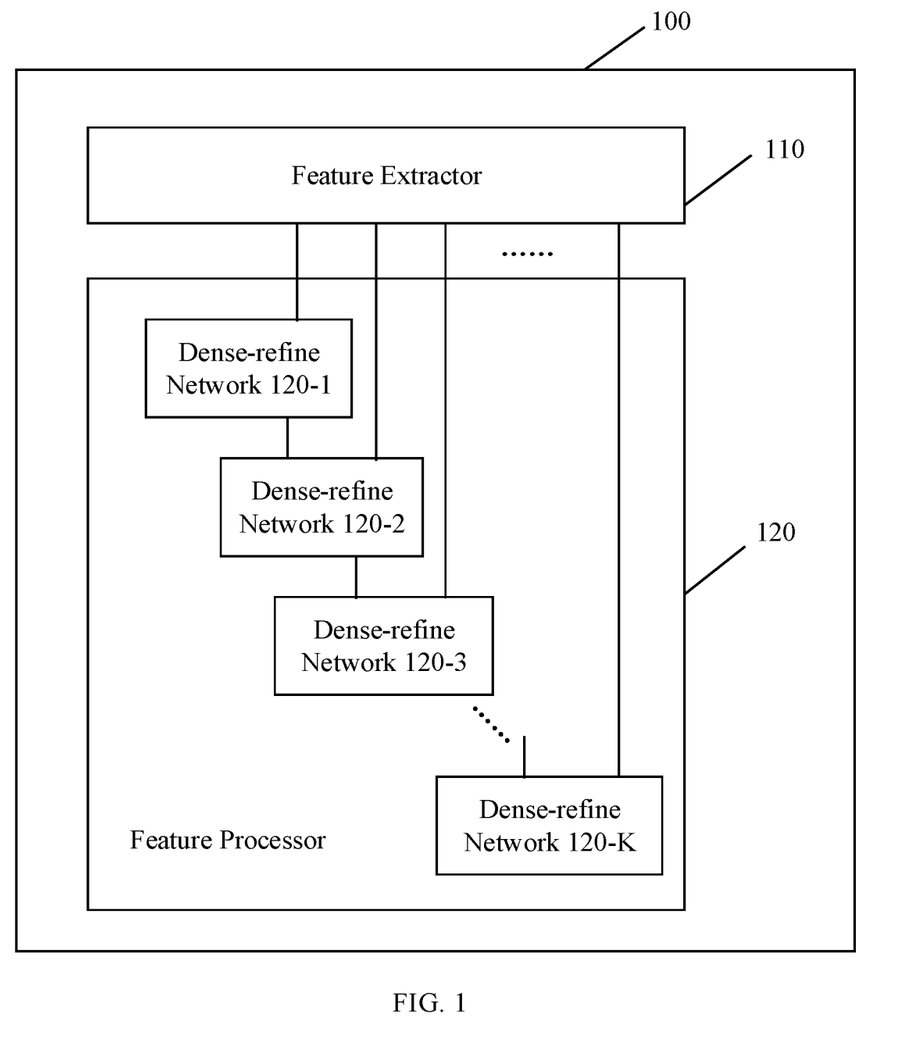
FIG. 1 is a schematic structural diagram of an image segmentation apparatus according to an embodiment of the present disclosure.

FIG. 1 is a schematic structural diagram of an image segmentation apparatus according to an embodiment of the present disclosure. As shown in FIG. 1, the image segmentation apparatus 100 may comprise: a feature extractor 110 and a feature processor 120.

The feature extractor 110 is configured to extract N image semantic features having different scales from an input image, where N is an integer not less than 3. The feature extractor 110 may be a feature extraction network based on a deep neural network, such as a convolutional neural network VGG-19. The N image semantic features may be output from different convolutional layers of the deep neural network, and have their respective scales.

Exemplarily, N scales may include an original scale of the input image. The N scales may further include other scales different from the original scale, such as a scale smaller than the original scale. For example, the N scales may include ½ scale, ¼ scale, ⅛ scale, 1/16 scale, 1/32 scale, etc. which are smaller than the original scale. In an example scenario, given N=4, the scales of the four image semantic features may be ½ scale, ¼ scale, ⅛ scale and 1/16 scale, respectively.

More comprehensive information may be extracted using multiple scales, and may include both global overall information and local details. Therefore, combination of multiple scales may help to analyze an input image more accurately and improve the accuracy of object recognition. In embodiments of the present disclosure, object recognition based on image semantic features of different scales may result in a positive anti-interference effect for the problem of unsatisfactory feature extraction effect of predetermined scene areas in the input image caused by occlusion (such as dense fog in the sky scene) and perspective (such as dark night in the sky scene).

The feature processor 120 receives the N image semantic features from the feature extractor 110 and performs feature processing on these image semantic features to obtain a binarized mask image for the input image, for example, a binarized mask image with a predetermined scene area (such as the sky) being segmented.

The feature processor 120 includes a plurality of cascaded dense-refine networks (Dense-RefineNet). A dense-refine network refers to a refine network constructed based on a deep neural network and configured to perform feature processing on an image. It reuses features by utilizing densely connected convolutional operations, thereby alleviating the gradient dissipation issue in a training process. According to an embodiment of the present disclosure, each of the dense-refine networks is configured to generate a low-frequency semantic feature from a plurality of semantic features input thereto. The dense-refine networks may be configured to perform densely-connected convolution processing on the plurality of semantic features respectively to obtain corresponding image global features, perform feature fusion on the image global features to obtain a fused image global feature, and perform pooling processing on the fused image global feature to generate and output a low-frequency semantic feature. The feature processor 120 is configured to obtain the binarized mask image based on the low-frequency semantic features generated by the dense-refine networks.

The semantic features input into a dense-refine network may be selected from a group consisting of the N image sematic features and a low-frequency semantic feature(s) generated by a dense-refine network(s). For example, as shown in FIG. 1, as for K cascaded dense-refine networks 120-1, 120-2, 120-3, ..., 120-K, a plurality of semantic features input into the first dense-refine network may all be the image semantic features, and the semantic features input into the $k^{th}$ dense-refine network may include a low-frequency semantic feature generated by the $k-1^{th}$ dense-refine network and image semantic features which do not undergo feature processing by the previous first to $k-1^{th}$ dense-refine networks, where $1<k\leq K$.

It is noted that a single connection from the feature extractor 110 to each dense refine network 120-1, 120-2, 120-3, ..., 120-K shown in FIG. 1 may represent one or more image semantic features provided from the feature extractor 110 to a corresponding dense-refine network. Moreover, it should be appreciated that the cascading relationship of dense-refine networks shown in FIG. 1 is merely exemplary, and the embodiments of the present disclosure are not limited thereto, but there may be other forms of cascading relationship.

Compared with the relevant art in which a complex network result is used to perform image segmentation, the image segmentation apparatus of embodiments of the present disclosure uses an efficient multi-level cascade of dense-refine networks to perform feature processing on image semantic features having multiple scales of an input image, thereby effectively improving the overall operation speed of the network.

In some embodiments, each dense-refine network 120-1, 120-2, 120-3, ..., 120-K includes L dense convolution units, a fusion unit, and a chain pooling unit. The L dense convolution units are configured to perform densely-connected convolution processing on L semantic features of different scales that are input to the dense-refine network to obtain corresponding L image global features, where $1<L<N$. The L image global features may have L scales different from one another.

The fusion unit is configured to perform feature fusion on the L image global features to obtain a fused image global feature having a specific scale. The specific scale may be selected based on the scale of a desired mask image. In one example, the specific scale may be the same as a maximum scale among the L scales that correspond to the L semantic features.

The chain pooling unit is configured to perform chain pooling processing on the fused image global feature to generate a low-frequency semantic feature of the specific scale as an output of the dense-refine network.

The feature processor 120 is configured to obtain the binarized mask image based on the low-frequency semantic feature generated by the last dense-refine network (e.g., the dense-refine network 120-K in FIG. 1) in the cascade.

The dense-refine networks may be cascaded according to a predetermined cascade relationship. In some embodiments, the feature processor 120 includes N−1 dense-refine networks cascaded according to a predetermined cascade relationship. N image semantic features are input in turn to the feature extractor 120 in an ascending order of scales (for example, from the first scale to the $N^{th}$ scale) for feature processing, in order to obtain the binarized mask image of a predetermined scene area in the input image.

In some embodiments, given L=2, i.e., each dense-refine network is input with two semantic features having adjacent scales, the predetermined cascade relationship may be defined in a way that two sematic features having adjacent scales and input into the first dense-refine network are an image semantic feature having a first scale and an image semantic feature having a second scale, and two sematic features of adjacent scales and input into the $n^{th}$ dense-refine network are a low-frequency semantic feature output by the $n-1^{th}$ dense-refine network and having the $n^{th}$ scale and an image semantic feature which is from the feature extractor 110 and having the $n+1^{th}$ scale, where $2\leq n\leq N-1$. Here, the low-frequency semantic feature having the $n^{th}$ scale is output by the $n-1^{th}$ dense-refine network. Correspondingly, the low-frequency semantic feature output by the first dense-refine network has the second scale (larger scale), i.e., the first dense-refine network outputs a low-frequency semantic feature having the second scale.

In these embodiments, the image semantic feature is a semantic feature corresponding to a larger scale of two adjacent scales. The low-frequency semantic feature is a semantic feature corresponding to a smaller scale in the two adjacent scales. The scale of the low-frequency semantic feature is the same as that of the semantic feature having a larger scale and input into a previous dense-refine network. In other words, the scale of the low-frequency semantic feature output by the $n^{th}$ dense-refine network is equal to the $n+1^{th}$ scale.

In these embodiments, any of the dense-refine networks in the feature extractor 120 performs feature processing on the two input semantic features. Each dense-refine network comprises two dense convolution units. The two dense convolution units are configured to perform densely-connected convolution processing on two sematic features having adjacent scales, respectively, so as to obtain two image global features having adjacent scales. The fusion unit is configured to perform feature fusion on the two image global features having adjacent scales to obtain a fused image global feature. The scale of the fused image global feature is the same as the larger scale of the two adjacent scales. The chain pooling unit is configured to perform pooling processing on the fused image global feature to generate the low-frequency semantic feature having the larger scale. The low-frequency semantic feature output by the $n^{th}$ dense-refine network has the $n+1^{th}$ scale, that is, the $n^{th}$ dense-refine network outputs a low-frequency semantic feature having the $n+1^{th}$ scale.

Figure 2:
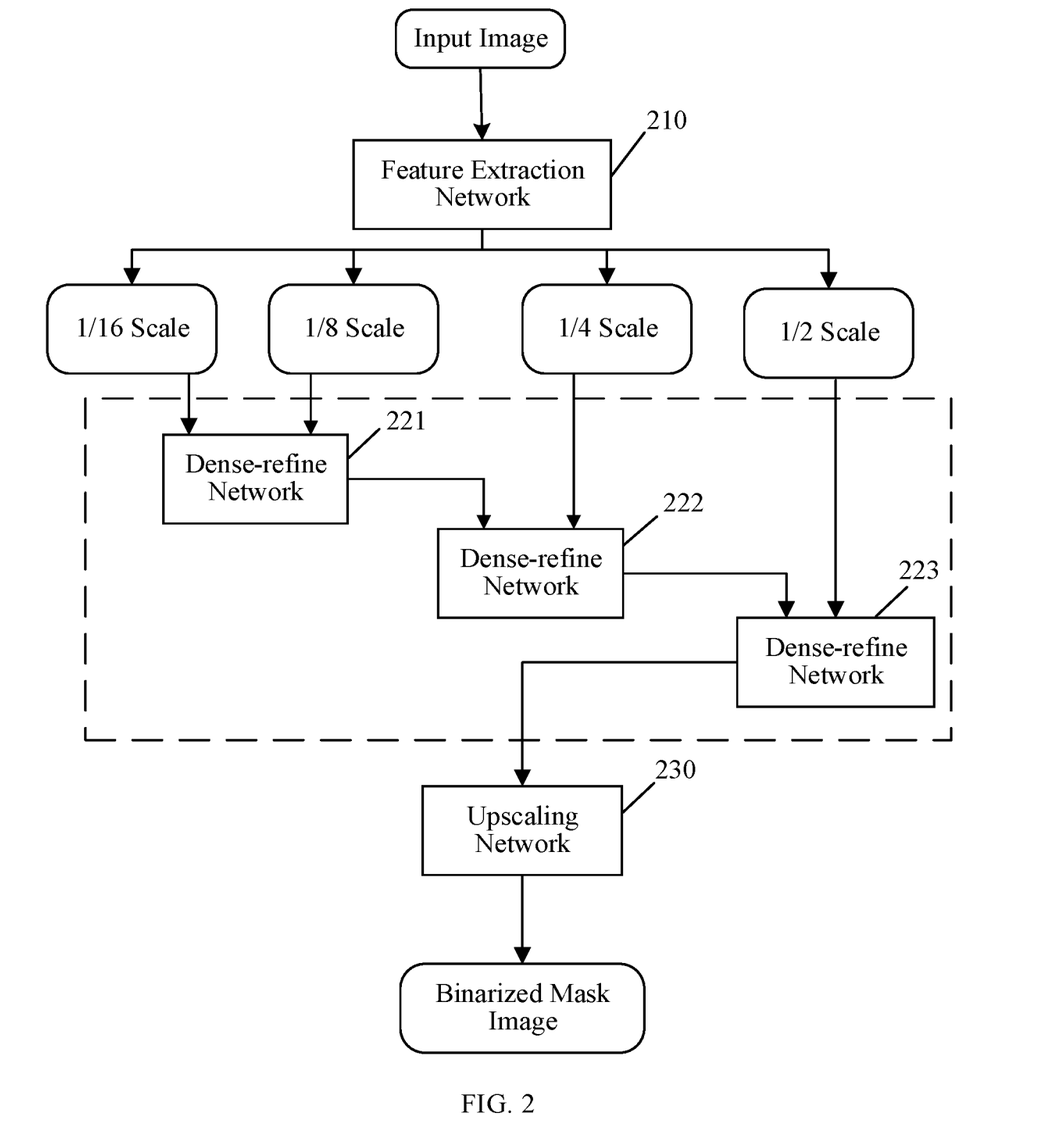
FIG. 2 is a diagram of an exemplary network structure for implementing an image segmentation apparatus according to an embodiment of the present disclosure.

FIG. 2 shows an exemplary network structure for implementing an image segmentation apparatus according to an embodiment of the present disclosure. As shown in FIG. 2, the network structure includes a feature extraction network 210 and a plurality of cascaded dense-refine networks 221, 222 and 223. It may be understood that although three cascaded dense-refine networks are shown, the present disclosure is not limited thereto, but may include more cascaded dense-refine networks.

The feature extraction network 210 is used to extract image semantic features from an input image. The feature extraction network 210 may be implemented by a deep neural network. The deep neural network may be a convolutional neural network, such as a VGG-19 network, or any other suitable convolutional neural network that may extract image features having different scales. The feature extraction network 210 may be pre-trained for a predetermined scene area, and may extract and recognize features of the predetermined scene area. For example, if the image segmentation apparatus is used to segment a sky scene area, the VGG-19 network may be used as a feature extraction network to implement the function of extracting image semantic features. The VGG-19 network is an open-source feature extraction and classification network developed by the Oxford University R&D team. The VGG-19 network learns most feature information in natural images after being trained with a very large number of datasets, which can better extract and recognize features in a predetermined scene area in an input image.

The feature extraction network 210 receives the input image, and extracts a plurality of image semantic features having different scales from the input image. For example, a feature map output by a predetermined convolution layer of a convolutional neural network may be taken as an extracted image semantic feature.

In the example of FIG. 2, the feature extraction network 210 extracts, from the input image, four image semantic features which have different scales. In one example, when the VGG-19 network is used to extract image semantic features from the input image, the outputs of the $4^{th}$, $8^{th}$, $12^{th}$ and $16^{th}$ convolution layers may be extracted as the four image semantic features, respectively. When the input image is considered as having 1 scale, the four image semantic features may have ½ scale, ¼ scale, ⅛ scale and 1/16 scale, respectively.

The image semantic features are input into the cascaded dense-refine networks for feature processing. In FIG. 2, the four image semantic features from the feature extraction network 210 are processed through three cascaded dense-refine networks 221, 222 and 223. Each dense-refine network receives two inputs. Among the three cascaded dense-refine networks, the image semantic feature having the 1/16 scale and the image semantic feature having the ⅛ scale are input into the first dense-refine network 221, whereas two inputs to other dense-refine networks 222 and 223 are respectively a low-frequency semantic feature output by a previous dense-refine network and an image semantic feature from the feature extraction network 210.

In this example, the first dense-refine network 221 performs feature processing on the image semantic feature having the 1/16 scale and the image semantic feature having the ⅛ scale to generate a low-frequency semantic feature having the ⅛ scale. The second dense-refine network 222 performs feature processing on the low-frequency semantic feature having the ⅛ scale and output by the first dense-refine network 221 and the image semantic feature having the ¼ scale from the feature extraction network 210, to generate the low-frequency semantic feature having the ¼ scale. The third dense-refine network 222 performs feature processing on the low-frequency semantic feature having the ¼ scale and output by the second dense-refine network 221 and the image semantic feature having the ½ scale from the feature extraction network 210, to generate the low-frequency semantic feature having the ½ scale. The low-frequency semantic feature generated by the last dense-refine network in the cascade, namely, the low-frequency semantic feature having the ½ scale and generated by the third dense-refine network 223 is used to obtain the binarized mask image.

In some embodiments, the network structure further includes an upscaling network 230. When the scale of the low-frequency semantic feature output from the last dense-refine network in the cascade is smaller than a scale of a desired binarized mask image, the low-frequency semantic feature may be upscaled by the upscaling network 230. As shown in FIG. 2, the low-frequency semantic feature having the ½ scale and generated by the third dense-refine network 223 may be for example 2 upscaled, to obtain a binarized mask image having a 1 scale. In some embodiments, the binarized mask image may also be filtered to filter out the interference caused by a glitch region in the input image, to obtain a more accurate image segmentation result.

It may be understood that although FIG. 2 shows four image semantic features having four scales are processed leveraging a three-level cascade relationship of dense-refine networks, embodiments of the present disclosure are not limited thereto. Rather, the embodiments of the present disclosure are also applicable to other numbers of image semantic features, and other numbers of dense-refine networks in other properly-deformed cascades.

Figure 3:
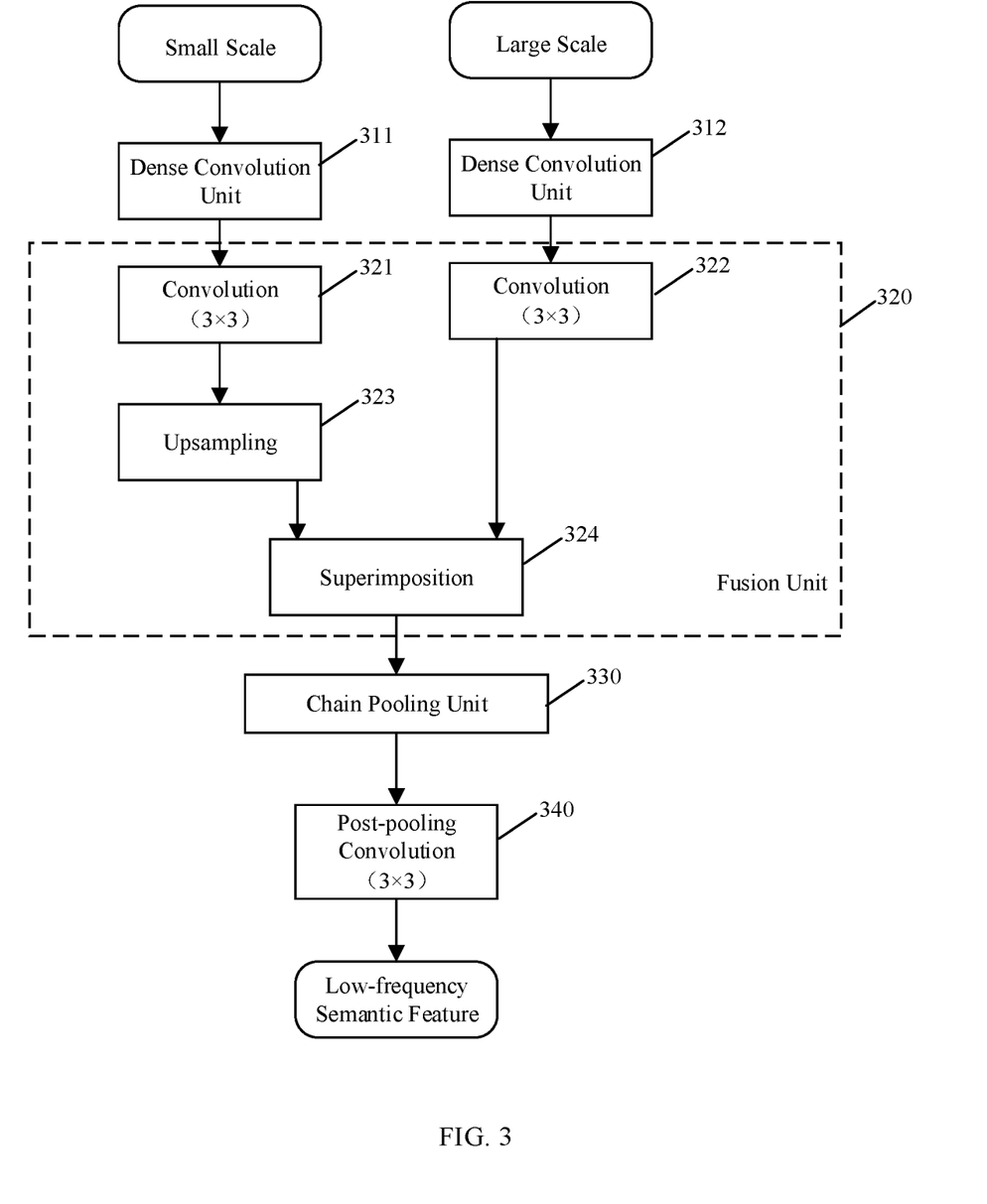
FIG. 3 is a schematic structural diagram of an exemplary dense-refine network according to an embodiment of the present disclosure.

FIG. 3 is a schematic structural diagram of a dense-refine network according to an embodiment of the present disclosure. The dense-refine network receives a plurality of semantic features having different scales, and then performs further feature processing on them to generate a low-frequency semantic feature. The semantic features may be image semantic features extracted from an input image, or may be low-frequency semantic features generated by other dense-refine networks. In this example, the dense-refine network receives two semantic features having respective scales, namely: a small-scale semantic feature and a large-scale semantic feature.

Referring to the exemplary scene shown in FIG. 2, if the dense-refine network is the first dense-refine network in a cascade, the small-scale semantic feature and large-scale semantic feature may be image semantic features corresponding to two smallest scales in respective scales, namely, the first scale and second scale. If the dense-refine network is the $n^{th}$ dense-refine network, the small-scale semantic feature and large-scale semantic feature may be a low-frequency semantic feature corresponding to the $n^{th}$ scale and an image semantic feature corresponding to the $n+1^{th}$ scale, where n is 2 or 3.

The dense-refine network includes dense convolution units 311, 312, a fusion unit 320, and a chain pooling unit 330.

A main function of the dense convolution units is to further extract features from the input semantic features, so that the output of the dense convolution units contains sufficient global semantic features. The dense convolution unit may be configured to perform densely-connected convolution processing on semantic features to extract image global features having corresponding scales. In this example, since two semantic features having respective scales are input into the dense-refine network, the dense-refine network includes two dense convolution units 311, 312. The two dense convolution units 311, 312 perform densely-connected convolution processing on the two semantic features having respective scales to obtain two global image features having respective scales. In FIG. 3, the small-scale image semantic feature is input to the dense convolution unit 311, and the large-scale image semantic feature is input to the dense convolution unit 312. Correspondingly, the dense convolution unit 311 outputs an image global feature having a small scale, and the dense convolution unit 312 outputs an image global feature having a large scale.

The fusion unit 320 is configured to perform feature fusion on image global features having different scales to obtain a fused image global feature having a specific scale. In some embodiments, the specific scale is the largest scale among different scales of the image global features received by the fusion unit.

In one embodiment, the fusion unit 320 may include convolution subunits 321, 322, an upsampling subunit 323 and a superimposition subunit 324. The convolution subunits 321, 322 are configured to perform convolution operations on the image global features from the dense convolution units 311, 312, respectively. The convolution operation may use for example a 3×3 convolution kernel. When the convolution subunits 321, 322 do not change the scales of their respective image global features, the upsampling subunit 323 is configured to upsample the small-scale image global feature from the convolution subunit 321 to enlarge its scale to be consistent with a specific scale to be output by the fusion unit 320. In some embodiments, the upsampling subunit 323 may be configured to perform the upsampling operation in a manner such as deconvolution. The superimposition subunit 324 is configured to superimpose the image global features that have a specific scale after being upsampled by the upsampling subunit 323 in order to obtain the fused image global feature having the specific scale. The superimposition may be a linear superimposition.

As an example, if the received ⅛-scale image global feature and ¼-scale image global feature are to be fused, the ⅛-scale image global feature may be upsampled to obtain an upsampled ¼-scale image global feature. The upsampled ¼-scale image global feature is superimposed with the received ¼-scale image global feature to obtain the fused ¼-scale image global feature.

The chain pooling unit 330 is configured to perform a chain pooling processing on the fused image global feature to generate a low-frequency semantic feature having the specific scale. The low-frequency semantic feature may be a low-frequency background semantic feature corresponding to a predetermined scene area.

In some embodiments, the dense-refine network may further include a post-pooling convolution unit 340 which is configured to perform a convolution operation on the low-frequency semantic feature generated by the chain pooling unit 330 (for example, by using Conv 3×3), and a convolution result thereof is taken as a final output from the dense-refine network.

According to an embodiment of the present disclosure, a dense-refine network performs feature processing on semantic features having different scales through dense convolution units, a fusion unit and a chain pooling unit to obtain a low-frequency semantic feature having a specific scale. Due to the fast operation speed of the dense convolution units, processing of the dense-refine network is very efficient. When feature processing is performed on image semantic features having multiple scales through a multi-level cascade of dense-refine networks, the overall operation speed of the networks may be effectively improved.

Figure 4:
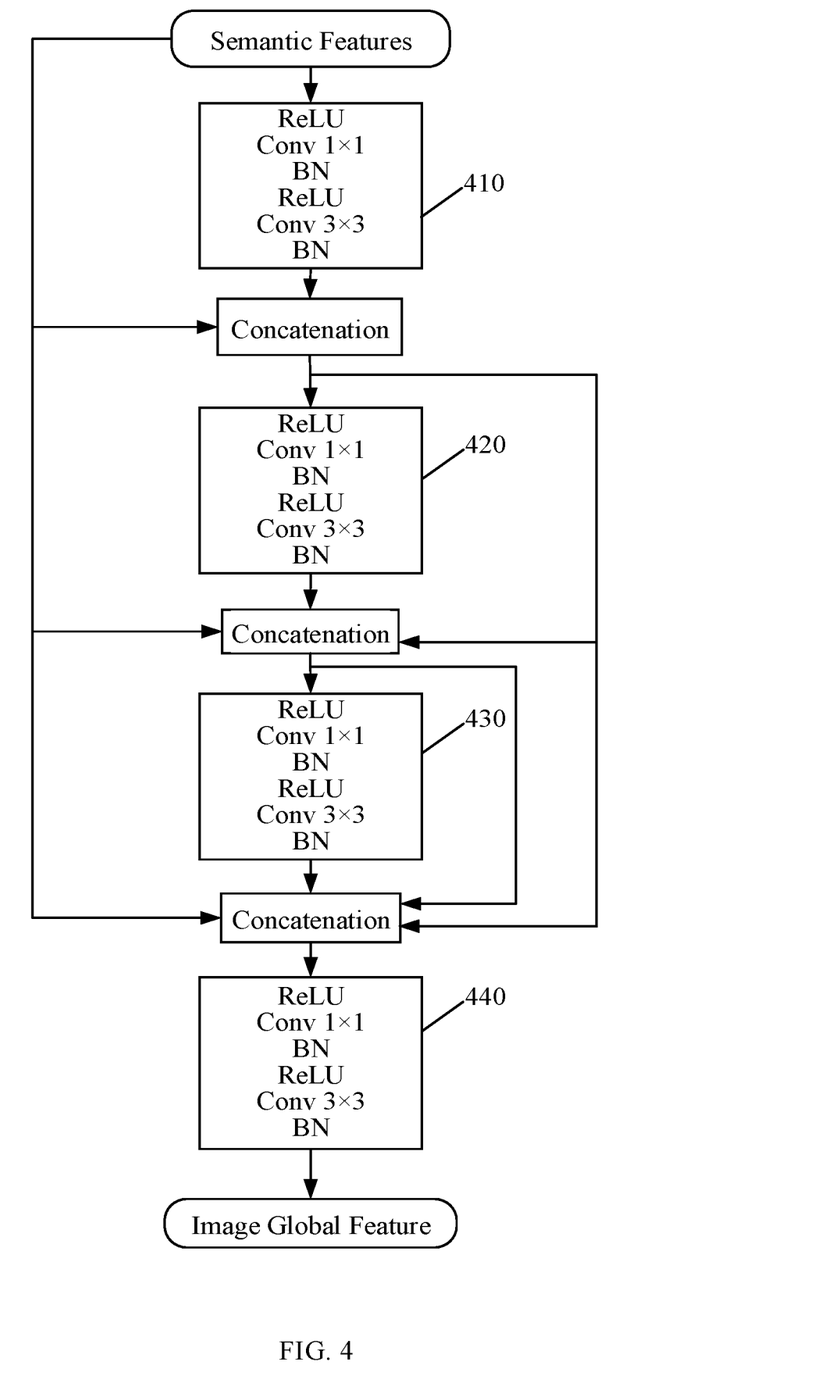
FIG. 4 is a schematic structural diagram of an exemplary dense convolution unit according to an embodiment of the present disclosure.

According to an embodiment of the present disclosure, a dense convolution unit may include M convolution sub-networks, where M is an integer not less than two. A convolution sub-network may include an activation function layer (ReLU), a first convolution layer (Conv 1×1), a batch normalization layer (BN), an activation function layer (ReLU), a second convolution layer (Conv 3×3) and a batch normalization layer (BN). Dense connections exist between convolution sub-networks. As such, a large number of features may be reused, so that each convolution layer may extract sufficient feature information using a small number of convolution kernels, thereby effectively improving the operation speed of a dense convolution unit.

In the embodiment of the present disclosure, all of the convolutional sub-networks in a dense convolution unit are connected in pairs, and a convolutional sub-network accepts features of all of its previous convolutional sub-network(s) as input. In one embodiment, performing densely-connected convolution processing on semantic features having a scale with a dense convolution unit may include performing convolution operation on the semantic features by a first-level convolution sub-network to output a respective convolution result; and performing convolution operation by the $m^{th}$-level convolution sub-network on an input of it to output a respective convolution result, wherein the input is generated by concatenating the image semantic features with convolution results output by the first to M–$1^{th}$ levels of convolution sub-networks, wherein 1<m<M. The output of the $M^{th}$-level convolution sub-network is taken as the image global feature finally output by the dense convolution unit.

FIG. 4 is a schematic structural diagram of a dense convolution unit according to an embodiment of the present disclosure. As shown in FIG. 4, the dense convolution unit includes the first to fourth levels of convolution sub-networks 410, 420, 430 and 440. The first-level convolution sub-network 410 performs a convolution operation on an input semantic feature(s) to output a first convolution result. The input semantic feature is concatenated with the first convolution result to obtain a first concatenation result. The second-level convolution sub-network 420 performs a convolution operation on the input first concatenation result and outputs a second convolution result. The input semantic feature is concatenated with the first concatenation result and the second convolution result to obtain a second concatenation result. The third-level convolution sub-network 430 performs a convolution operation on the input second concatenation result and outputs a third convolution result. The input semantic feature is concatenated with the first concatenation result, the second concatenation result and the third convolution result to obtain a third concatenation result. The fourth-level convolution sub-network performs a convolution operation on the input third concatenation result and outputs a fourth convolution result. The fourth convolution result is taken as the image global feature finally output by the dense convolution unit.

In some embodiments, those skilled in the art may set the number of convolution kernels of each level of convolution sub-network as appropriate, for example, setting it to 16 or 32.

According to the embodiment of the present disclosure, the number of convolution kernels of each level of convolution sub-network in the dense convolution unit may be very small, so that the number of output channels of the dense convolution unit is also very small. This will further improve the processing efficiency of the dense-refine network. For example, in the example of FIG. 4, the number of convolution kernels of each level of convolution sub-network may be set to 32.

According to the embodiment of the present disclosure, since each of the levels of convolutional sub-network in the dense convolution unit concatenates the output result of a previous level and the convolution result of the current level and reduces dimensions, the output of each level of convolution sub-network contains sufficient global semantic features. This enables each convolutional layer to use a smaller number of convolution kernels to extract sufficient feature information, so the operation speed of the dense convolution unit can be efficiently enhanced, and then the processing efficiency of the dense-refine network can be efficiently improved. As a result, the overall operation speed of the network is further improved.

Figure 5:
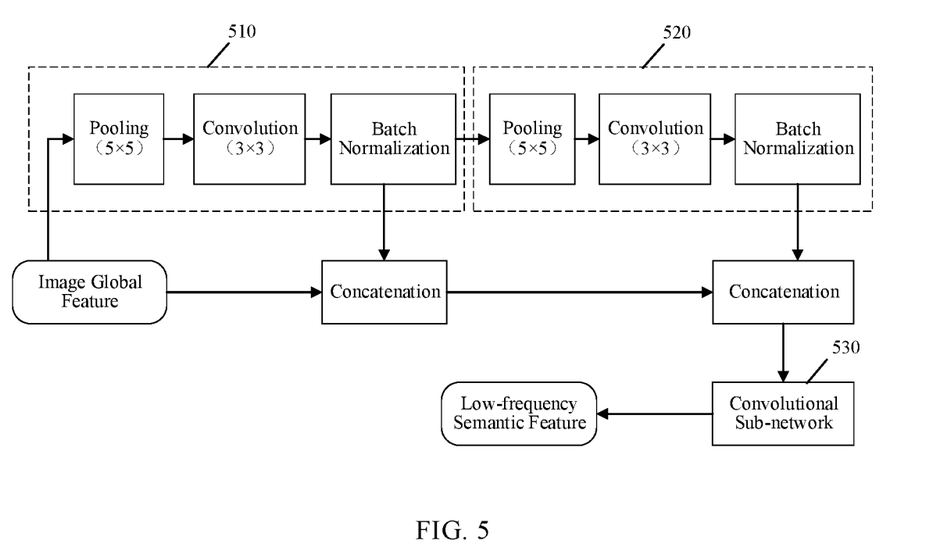
FIG. 5 is a schematic structural diagram of an exemplary chain dense pooling unit according to an embodiment of the present disclosure.

According to an embodiment of the present disclosure, a chain pooling unit may be a chain dense pooling unit. The chain dense pooling unit may include W pooling networks that are chain-connected and a convolutional sub-network, where W is an integer not less than 2. In some embodiments, pooling operation may be performed on a fused image global feature through a first pooling network to output a respective pooling result; pooling operation is performed on an input to a $w^{th}$ pooling network through the $w^{th}$ pooling network to output a respective pooling result, where the input is the pooling result output by a $w-1^{th}$ pooling network, and $1<w<W$; the fused image global feature is concatenated with the pooling results output by the W pooling networks to generate a concatenated pooling output; and a convolution operation is performed on the concatenated pooling output through the convolution sub-network to output a low-frequency semantic feature.

The convolutional sub-networks 410, 420, 430 and 440 may each include an activation function layer (ReLU), a first convolution layer (Conv 1×1), a first batch normalization layer (BN), an activation function layer (ReLU), and a second convolution layer (Conv 3×3), and a second batch normalization layer (BN). Those skilled in the art may set the number of convolution kernels in a chain dense pooling unit as appropriate, for example, setting the number to 32.

FIG. 5 is a schematic structural diagram of a chain dense pooling unit according to an embodiment of the present disclosure. As shown in FIG. 5, the chain dense pooling unit includes two pooling networks 510, 520 and a convolution sub-network 530. In one example, the pooling network may include a pooling layer, a convolution layer and a batch normalization layer (BN). In this example, a first pooling network 510 performs pooling processing on an input fused image global feature, and outputs a first pooling result. The input fused image global feature is concatenated with the first pooling result to obtain a first concatenation result. A second pooling network 520 performs pooling processing on the input first pooling result, and outputs a second pooling result. The second pooling result is concatenated with the first concatenation result to obtain a second concatenation result. The convolution sub-network 530 performs convolution processing on the input second concatenation result. A convolution result thereof is taken as a low-frequency semantic feature finally output by the chain dense pooling unit.

According to the embodiments of the present disclosure, the chain dense pooling unit may be used to obtain low-frequency semantic features of semantic features through a pooling process, and the low-frequency semantic features are reused together with the input semantic feature in a dense convolution manner to thereby obtain a global low-frequency semantic feature. This effectively improves recognition accuracy of a predetermined scene area. In addition, since dense connections exist between pooling networks in the chain dense pooling unit, a lot of features are reused so that each pooling network can implement extraction of a low-frequency semantic feature by using a small number of pooling kernels and convolution kernels. Therefore, this makes it possible to effectively increase the operation speed of the chain dense pooling unit, and thereby effectively improve the processing efficiency of a dense-refine network. As a result, the overall operation speed of the network is further improved.

In some embodiments, network models may be trained before respective networks that are based on the deep learning technique are employed to find optimal network parameters. According to an embodiment of the present disclosure, a loss function may be used to measure the degree of errors in image segmentation. For example, if a prediction result obtained by segmenting a specific scene area (such as the sky) in an input image using an image segmentation approach according to an embodiment of the present disclosure is I', and a real result of segmenting the specific scene area in the input image is I, the network's loss function Loss may be defined as:

$$Loss = \frac{1}{H \times W} \sum_{i \in H, j \in W} (I'_{ij} - I_{ij})^2$$

where H and W are the width and height of the input image, respectively.

Exemplarily, the parameters of the network model may be adjusted by using a stochastic gradient descent method. A learning rate may be set to $1e^{-4}$. It may be understood that the embodiments of the present disclosure are not limited thereto. Instead, any other suitable parameter adjustment algorithm may be used.

In one example, when a feature extraction network is a VGG-19 network, pre-training parameters of the VGG-19 network may be directly imported in a training process. This can save training time.

In another example, for example, when a predetermined scene area to be segmented from an input image is a sky scene area, a SkyFinder dataset containing sky objects may be used for training and testing. It may be understood that a dataset to be used for training and testing may be appropriately selected according to the predetermined scene area to be segmented. The number of training sets and testing sets may be set according to actual requirements. For example, a ratio of the number of training sets to that of testing sets may be set to 9:1. The SkyFinder dataset has 46 scenes and more than 80,000 frames of pictures. As an example, during training, 20 image frames may be randomly extracted from each scene for each iteration process, i.e., 900 image frame are extracted for training in each iteration, and the training is performed through 100 iterations. As such, 90,000 image frames will be used for the training. When images to be used in the training are selected, some images may be extracted multiple times, and some images are not extracted. This may prevent occurrence of overfitting. Experimental tests show that the image segmentation approach according to the embodiment of the present disclosure has a better recognition accuracy for asky scene area in the input image after network training is performed in this manner.

Figure 6:
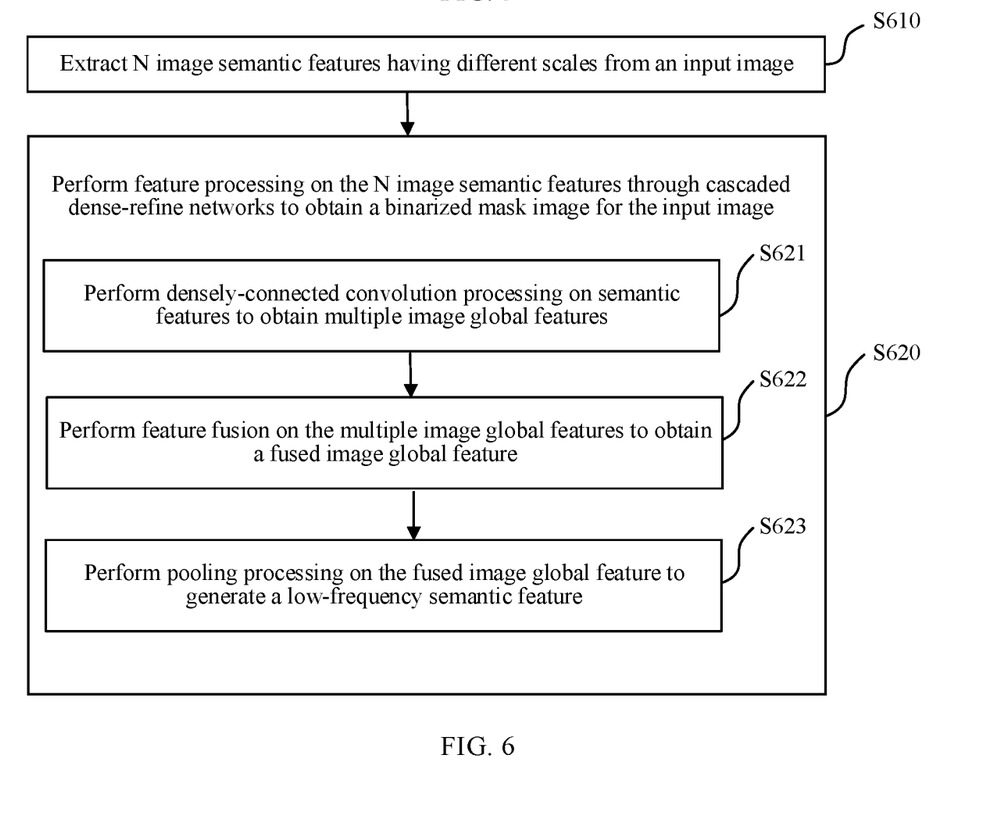
FIG. 6 is a flowchart of an exemplary image segmentation method according to an embodiment of the present disclosure.

FIG. 6 shows an image segmentation method according to an embodiment of the present disclosure. At step S610, N image semantic features having different scales are extracted from the input image, where N is an integer not less than 3. These image semantic features are image semantic features directly extracted from the original image. Extraction of image semantic features having different scales may mean performing feature extraction for the input image based on different scales. The scales being based on may define scales of the extracted image semantic features. Exemplarily, image semantic features extracted based on a smaller scale may contain high-resolution detail information, and image semantic features extracted based on a larger scale may contain global information for classification.

In some embodiments, feature maps obtained by convolving an input image through a convolutional neural network may be extracted from different convolutional layers when the convolution is performed. These feature maps usually have different scales and may be used as image semantic features having different scales. In general, the deeper a convolutional layer is, the more abstract a feature map extracted from the convolution layer is, and the more advanced the extracted feature is.

In some embodiments, the scales correspond to respective cascaded dense-refine networks in an ascending order.

At step S620, feature processing is performed on the N image semantic features through a plurality of cascaded dense-refine networks. The feature processing includes the following sub-steps performed by each dense-refine network. At step S621, densely-connected convolution processing is performed on multiple semantic features input thereto, respectively, to obtain multiple image global features. The multiple semantic features are selected from a group consisting of the N image sematic features and low-frequency semantic features generated by respective dense-refine networks. At step S622, feature fusion is performed on the multiple image global features to obtain a fused image global feature. At step S623, pooling processing is performed on the fused image global feature, to generate and output a low-frequency semantic feature.

At step S630, a binarized mask image of the input image, e.g., a binarized mask image of a predetermined scene area in the input image is obtained based on a low-frequency semantic feature generated by the dense-refine networks. Each dense-refine network may receive L semantic features having different scales as input, where 1<L<N. Semantic features may be image semantic features extracted from the input image, or low-frequency semantic features output by the dense-refine network. In some embodiments, except for the first dense-refine network in the cascaded dense-refine networks, the L semantic features input to a dense-refine network include a low-frequency semantic feature output by a previous dense-refine network and L−1 image semantic features that have not yet been feature-processed by a previous dense-refine network(s).

According to the embodiment of the present disclosure, the feature processing further includes: performing densely-connected convolution processing on L semantic features, respectively, to obtain L corresponding image global features; performing feature fusion on the L image global features to obtain a fused image global feature having a specific scale, where the specific scale may be the same as a maximum scale among the L scales corresponding to the L semantic features; and performing chain pooling processing on the fused image global feature to generate a low-frequency semantic feature having the specific scale.

The binarized mask image is obtained based on the low-frequency semantic feature output from the last dense-refine network in the cascaded dense-refine networks.

Compared with an image segmentation approach utilizing a complex network structure in relevant art, the image segmentation method of the embodiments of the present disclosure uses an efficient cascade of dense-refine networks to perform feature processing for image semantic features of an input image that have multiple scales, thereby effectively improving the overall operation speed of the network.

In one example, given L=2, two semantic features having respective scales are input into each of the dense-refine networks. The two scales may be two adjacent ones among scales arranged for example in an ascending order. For example, when the N scales of the extracted image semantic features include ½ scale, ¼ scale, ⅛ scale and ¹⁄₁₆ scale, two adjacent scales may be ¹⁄₁₆ scale and ⅛ scale, or ⅛ scale and ¼ scale, or ¼ scale and ½ scale. Those skilled in the art should understand that the pairs having adjacent scales given here are merely examples, and the embodiments of the present disclosure are not limited thereto. On the contrary, suitable variations made based on these examples are also applicable to the present disclosure, and therefore should be included in the protection scope of the present disclosure.

In one example, a relationship between scales may be that the second scale is twice the first scale; and the $n+1^{th}$ scale is twice the $n^{th}$ scale.

It may be understood that all the possibilities discussed with respect to FIG. 1 through FIG. 5 are also valid for FIG. 6. Embodiments of the image segmentation method may correspond to the embodiments of the apparatus.

Figure 7:
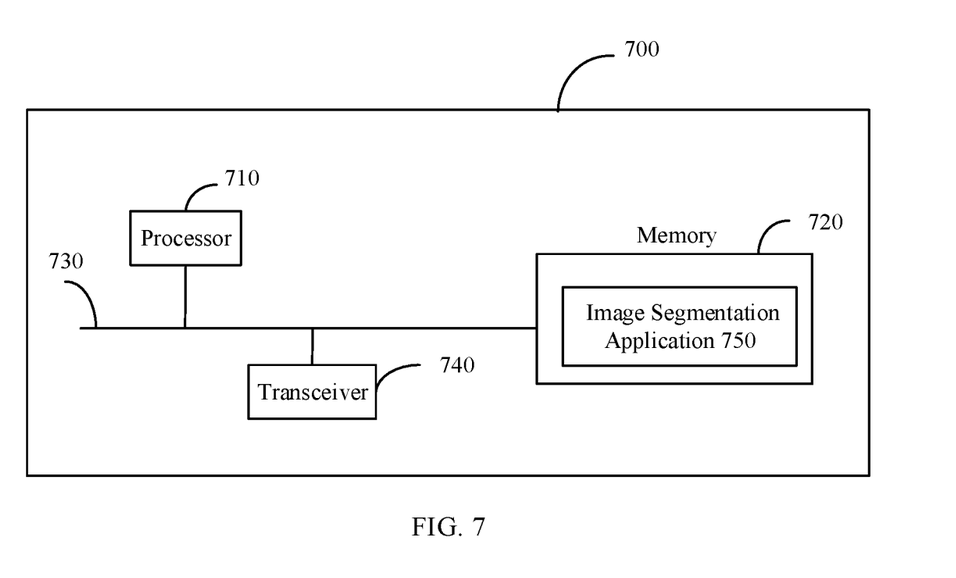
FIG. 7 is a schematic structural diagram of an exemplary computing device according to an embodiment of the present disclosure.

FIG. 7 shows a schematic structural diagram of an exemplary computing device 700 according to an embodiment of the present disclosure. The computing device 700 may be, for example, a server of a service provider, a device associated with a client (e.g., a client device), a system on chip, and/or any other suitable computing device or computing system.

As shown in FIG. 7, the computing device 700 includes a processor 710 and a memory 720. The processor 710 and the memory 720 are communicatively coupled to each other. The computing device 700 may further include a bus 730 to couple various components to each other. In some embodiments, the computing device 700 may further include a transceiver 740. It should be noted that the transceiver 740 may not be limited to one. It may be understood that the embodiments of the present disclosure are not limited to the shown structure of the computing device 700, but may include other applicable components.

The processor 710 represents a function of performing one or more operations with hardware. The processor 710 may be a CPU, a general-purpose processor, a DSP, an ASIC, an FPGA, or other programmable logic device, a transistor logic device, a hardware component, or any combination thereof. It may implement or execute various exemplary logical blocks, modules and circuits described in conjunction with the content of the present disclosure. The processor 710 may also be a combination implementing the computing function, for example, include a combination of one or more microprocessors, a combination of a DSP and a microprocessor, and so on.

The memory 720 may be a ROM or other type of static storage devices that may store static information and instructions, and may also be a RAM or other type of dynamic storage devices that may store information and instructions. The memory 720 may also be an EEPROM, a CD-ROM or other optical disk storage, an optical disc storage (including a compact disc, a laser disc, an optical disc, a digital versatile disc, a Blu-ray disc, etc.), a magnetic disk storage medium or other magnetic storage devices, or any other media capable of carrying or storing desired program code in the form of instructions or data structure and being accessible by a computer. The memory 720 is configured to store application program code which may be executed by the processor 710 to implement the image segmentation method according to an embodiment of the present disclosure.

The bus 730 is used to transmit data and commands between the aforementioned components. The bus 730 may be a PCI bus, an EISA bus, or the like. The bus 730 may be classified into an address bus, a data bus, a control bus and so on. A system bus can include any one or combination of different bus structures, such as a memory bus or memory controller, a peripheral bus, a universal serial bus, and/or a processor or local bus that utilizes any of a variety of bus architectures. The transceiver 740 may include a receiver and a transmitter.

The image segmentation apparatus according to embodiments of the present disclosure, for example the image segmentation apparatus described above with respect to FIGS. 1-6, may take a form of the computing device 700. Alternatively, the image segmentation apparatus may also be implemented as a computer program in a form of an image segmentation application 750.

Implementations of the described modules and techniques may be stored on a certain form of computer readable medium or transmitted across a certain form of computer-readable medium. The "module" and "unit" in the embodiments of the present disclosure may refer to a general-purpose processor, Digital Signal Processor (DSP), Application-Specific Integrated Circuit (ASIC), Field Programmable Gate Array (FPGA) or other programmable logic device, discrete gate or transistor logic device, discrete hardware components, a processor and a memory executing one or more software or firmware programs, an integrated logic circuit, and/or other devices that may provide the above functions. In contrast to pure signal transmission, carrier waves or the signals themselves, the computer-readable storage medium refer to a medium and/or device capable of persistently storing information, and/or a tangible storage device. Therefore, the computer-readable storage medium refers to a non-signal bearing medium. The computer readable storage media may comprise e.g. volatile and nonvolatile, removable and non-removable media and/or hardware such as a storage device implemented in any method or technology for storage of information, such as computer readable instructions, data structures, program modules, logic elements/circuits or other data. Examples of the computer readable storage media may comprise, but is not limited to, RAM, ROM, electrically erasable read-only memory (EEPROM), flash memory or other memory technology, CD-ROM, digital versatile disks (DVD) or other optical storage, hard disk, magnetic cassettes, magnetic tape, magnetic disk storage or other magnetic storage devices, or other storage devices, tangible media or articles which can be used to store information and which can be accessed by a computer. A computer program is stored on the computer-readable storage medium, and the program, when executed by a processor, implements the image segmentation method shown in the above method embodiments.

It should be understood that although steps in the flowcharts of the drawings are sequentially displayed as indicated by the arrows, these steps are not necessarily executed in the order indicated by the arrows. Except as explicitly stated herein, the execution order of these steps is not strictly limited, and these steps may be executed in other sequences. Moreover, at least some of the steps in the flowcharts of the drawings may include a plurality of sub-steps or stages, which are not necessarily executed at the same time, but may be executed at different times, and which are not necessarily executed sequentially, but may be executed in turn or alternately with other steps or at least a portion of sub-steps or stages of other steps.

Although the present disclosure has been described in conjunction with some embodiments, it is not intended to be limited to the specific form set forth herein. Rather, the scope of the present disclosure is limited only by the accompanying claims. Additionally, although individual features may be included in different claims, these features may possibly be advantageously combined, and the inclusion in different claims does not imply that a combination of the features is not feasible and/or advantageous. The order of the features in the claims does not imply that the features must be in any specific order in which they work. Furthermore, in the claims, the word "comprise" does not exclude other elements, and the words "a" or "an" do not exclude a plurality. Reference signs in the claims are provided only as definite examples and shall not be construed as limiting the scope of the claims in any way.

The invention claimed is:

1. An image segmentation apparatus, comprising:
   a feature extractor configured to extract N image semantic features having different scales from an input image, where N is an integer not less than 3; and
   a feature processor comprising cascaded dense-refine networks and being configured to perform feature processing on the N image semantic features to obtain a binarized mask image of the input image,
   wherein each of the dense-refine networks is configured to generate a low-frequency semantic feature from semantic features input thereto by: performing densely-connected convolution processing on the semantic features respectively to obtain respective image global features, performing feature fusion on the image global features to obtain a fused image global feature, and performing pooling processing on the fused image global feature to generate and output the low-frequency semantic feature; and
   wherein the semantic features are selected from a group consisting of the N image sematic features and low-frequency semantic features generated by the dense-refine networks, and the feature processor is configured to obtain the binarized mask image based on a low-frequency semantic features generated by the dense-refine networks.

2. The image segmentation apparatus according to claim 1, wherein each of the dense-refine networks comprises:
   L dense convolution units configured to perform densely-connected convolution processing on L semantic features which have different scales and are input to the dense-refine network to obtain respective L image global features, where 1<L<N;
   a fusion unit configured to perform feature fusion on the L image global features to obtain a fused image global feature having a specific scale, wherein the specific scale is a maximum scale among scales of the L semantic features; and
   a chain pooling unit configured to perform chain pooling processing on the fused image global feature to generate a low-frequency semantic feature having the specific scale;
   wherein the feature processor is configured to obtain the binarized mask image based on the low-frequency semantic feature generated by a last dense-refine network in the cascade.

3. The image segmentation apparatus according to claim 2, wherein the feature processor comprises N−1 dense-refine networks cascaded according to a predetermined cascade relationship, and is configured to perform feature processing on the N image semantic features sequentially in an ascending order of scales;

wherein, given L=2, the predetermined cascade relationship is: two sematic features having adjacent scales and input into a first dense-refine network comprise an image semantic feature having a first scale and an image semantic feature having a second scale, and two sematic features having adjacent scales and input into an $n^{th}$ dense-refine network comprise a low-frequency semantic feature having an $n^{th}$ scale and an image semantic feature having an $n+1^{th}$ scale, and the low-frequency semantic feature having the $n^{th}$ scale is output by an $n-1^{th}$ dense-refine network, where $2 \le n \le N-1$.

4. The image segmentation apparatus according to claim 3, wherein each of the dense-refine networks comprises two dense convolution units, and the two dense convolution units are configured to perform densely-connected convolution processing on two sematic features having adjacent scales, respectively, to obtain two image global features having adjacent scales;

the fusion unit is configured to perform feature fusion on the two image global features having adjacent scales to obtain the fused image global feature, and a scale of the fused image global feature is the same as a larger scale of the adjacent scales; and the chain pooling unit is configured to perform pooling processing on the fused image global feature to generate the low-frequency semantic feature having the larger scale.

5. The image segmentation apparatus according to claim 2, wherein the dense convolution units comprise M levels of convolution sub-networks, M being an integer not less than two, and the dense convolution units are configured to:

perform convolution operation on the image semantic features through a first-level convolution sub-network to output a respective convolution result; and perform convolution operation on an input to an $m^{th}$-level convolution sub-network through the $m^{th}$-level convolution sub-network to output a respective convolution result, wherein the input is generated by concatenating the image semantic features with the convolution results output by the first to $m-1^{th}$ levels of convolution sub-networks, wherein $2 \le m \le M$;

wherein an output of an $M^t$-level convolution sub-network is taken as the image global feature obtained by the dense convolution unit.

6. The image segmentation apparatus according to claim 2, wherein the chain pooling unit comprises a chain dense pooling unit, the chain dense pooling unit comprises cascaded W pooling networks and a convolutional sub-network, W is an integer not less than 2, and the chain dense pooling unit is configured to:

perform pooling operation on the fused image global feature through a first pooling network to output a respective pooling result;

perform pooling operation on an input to a $w^{th}$ pooling network through the $w^{th}$ pooling network to output a respective pooling result, where the input comprises the pooling result output by a $w-1^{th}$ pooling network, and $1 < w \le W$;

chain-concatenate the fused image global feature with the pooling results output by the W pooling networks to generate a concatenated pooling output; and perform convolution operation on the concatenated pooling output through the convolution sub-network to generate a respective low-frequency semantic feature.

7. The image segmentation apparatus according to claim 2, wherein the fusion unit comprises:

convolution sub-units configured to perform convolution operations on the L image global features from the dense convolution units, respectively;

an upsampling subunit configured to upsample image global features which are among convoluted L image global features and have scales smaller than the specific scale; and a superimposition subunit configured to superimpose the upsampled image global features with the image global feature having the specific scale to generate the fused image global feature having the specific scale.

8. The image segmentation apparatus according to claim 1, wherein the feature extractor is configured to extract the image semantic features from the input image by using a convolutional neural network VGG-19.

9. An image segmentation method, comprising:

extracting N image semantic features having different scales from an input image, where N is an integer not less than 3; and performing feature processing on the N image semantic features through cascaded dense-refine networks, the feature processing comprising the following steps performed by each of the dense-refine networks:

performing densely-connected convolution processing on semantic features input thereto, respectively, to obtain multiple image global features, the semantic features being selected from a group consisting of the N image sematic features and low-frequency semantic features generated by the dense-refine networks;

performing feature fusion on the multiple image global features to obtain a fused image global feature; and performing pooling processing on the fused image global feature, to generate and output a low-frequency semantic feature; and obtaining a binarized mask image of the input image based on a low-frequency semantic feature generated by the define-refine networks.

10. The image segmentation method according to claim 9, wherein L semantic features having different scales are input to each of the dense-refine networks, and the feature processing comprises the following steps performed by each of the dense-refine networks:

performing densely-connected convolution processing on the L semantic features respectively to obtain L image global features, where $1 < L < N$;

performing feature fusion on the L image global features to obtain a fused image global feature having a specific scale, wherein the specific scale is a maximum scale among the scales of the L semantic features; and performing chain pooling processing on the fused image global feature to generate a low-frequency semantic feature having the specific scale;

wherein the binarized mask image is obtained based on a low-frequency semantic feature generated by a last dense-refine network in the cascade.

11. The image segmentation method according to claim 10, wherein the cascaded dense-refine networks comprise N-1 dense-refine networks cascaded according to a predetermined cascade relationship, and the feature processing is performed on the N image semantic features sequentially in an ascending order of scales, wherein, given L=2, the predetermined cascade relationship is: two sematic features having adjacent scales and input into a first dense-refine network comprise an image semantic feature having a first scale and an image semantic feature having a second scale, and two sematic features having adjacent scales and input into an $n^{th}$ dense-refine network comprise a low-frequency semantic feature having an $n^{th}$ scale and an image semantic feature having an $n+1^{th}$ scale, and the low-frequency semantic feature having the $n^{th}$ scale is output by an $n-1^{th}$ dense-refine network, where $2 \leq n \leq N-1$.

12. The image segmentation method according to claim 9, wherein the densely-connected convolution processing comprises the following steps performed by M levels of convolution sub-networks:
   performing convolution operation on the image semantic features through a first-level convolution sub-network to output a respective convolution result; and
   performing convolution operation on an input to an $m^{th}$-level convolution sub-network through the $m^{th}$-level convolution sub-network to output a respective convolution result, wherein the input is generated by concatenating the image semantic features with the convolution results output by the first to $m-1^{th}$ levels of convolution sub-networks, wherein $2 \leq m \leq M$;
   wherein an output of an $M^t$-level convolution sub-network is taken as a corresponding obtained image global feature.

13. The image segmentation method according to claim 9, wherein the chain pooling processing comprises the following steps performed by cascaded W pooling networks and a convolution sub-network:
   performing pooling operation on the fused image global feature through a first pooling network to output a respective pooling result;
   performing pooling operation on an input to a $w^{th}$ pooling network through the $w^{th}$ pooling network to output a respective pooling result, where the input is the pooling result output by a $w-1^{th}$ pooling network, and $1<w<W$ and W is an integer not less than 2;
   concatenating the fused image global feature with the pooling results output by the W pooling networks to generate a concatenated pooling output; and
   performing convolution operation on the concatenated pooling output to generate the low-frequency semantic feature.

14. A computing device, comprising: a processor and a memory;
   the memory storing executable instructions, which, when executed by the processor, cause the processor to perform the image segmentation method according to claim 9.

15. A non-transitory computer storage medium on which computer-executable instructions are stored, the computer-executable instructions, when executed by a processor, causing the processor to perform the image segmentation method according to claim 9.

16. The image segmentation apparatus according to claim 3, wherein the dense convolution units comprise M levels of convolution sub-networks, M being an integer not less than two, and the dense convolution units are configured to:
   perform convolution operation on the image semantic features through a first-level convolution sub-network to output a respective convolution result; and
   perform convolution operation on an input to an $m^{th}$-level convolution sub-network through the $m^{th}$-level convolution sub-network to output a respective convolution result, wherein the input is generated by concatenating the image semantic features with the convolution results output by the first to $m-1^{th}$ levels of convolution sub-networks, wherein $2 \leq m \leq M$;
   wherein an output of an $M^t$-level convolution sub-network is taken as the image global feature obtained by the dense convolution unit.

17. The image segmentation apparatus according to claim 3, wherein the chain pooling unit comprises a chain dense pooling unit, the chain dense pooling unit comprises cascaded W pooling networks and a convolutional sub-network, W is an integer not less than 2, and the chain dense pooling unit is configured to:
   perform pooling operation on the fused image global feature through a first pooling network to output a respective pooling result;
   perform pooling operation on an input to a $w^{th}$ pooling network through the $w^{th}$ pooling network to output a respective pooling result, where the input comprises the pooling result output by a $w-1^{th}$ pooling network, and $1<w<W$;
   chain-concatenate the fused image global feature with the pooling results output by the W pooling networks to generate a concatenated pooling output; and
   perform convolution operation on the concatenated pooling output through the convolution sub-network to generate a respective low-frequency semantic feature.

18. The image segmentation apparatus according to claim 3, wherein the fusion unit comprises:
   convolution sub-units configured to perform convolution operations on the L image global features from the dense convolution units, respectively;
   an upsampling subunit configured to upsample image global features which are among convoluted L image global features and have scales smaller than the specific scale; and
   a superimposition subunit configured to superimpose the upsampled image global features with the image global feature having the specific scale to generate the fused image global feature having the specific scale.

19. The image segmentation method according to claim 10, wherein the densely-connected convolution processing comprises the following steps performed by M levels of convolution sub-networks:
   performing convolution operation on the image semantic features through a first-level convolution sub-network to output a respective convolution result; and
   performing convolution operation on an input to an $m^{th}$-level convolution sub-network through the $m^{th}$-level convolution sub-network to output a respective convolution result, wherein the input is generated by concatenating the image semantic features with the convolution results output by the first to $m-1^{th}$ levels of convolution sub-networks, wherein $2 \leq m \leq M$;
   wherein an output of an $M^t$-level convolution sub-network is taken as a corresponding obtained image global feature.

20. The image segmentation method according to claim 10, wherein the chain pooling processing comprises the following steps performed by cascaded W pooling networks and a convolution sub-network:
   performing pooling operation on the fused image global feature through a first pooling network to output a respective pooling result;
   performing pooling operation on an input to a $w^{th}$ pooling network through the $w^{th}$ pooling network to output a respective pooling result, where the input is the pooling result output by a w−1$^{th}$ pooling network, and 1<w<W and W is an integer not less than 2;

concatenating the fused image global feature with the pooling results output by the W pooling networks to generate a concatenated pooling output; and performing convolution operation on the concatenated pooling output to generate the low-frequency semantic feature.

* * * * *